Figures 1, 3:
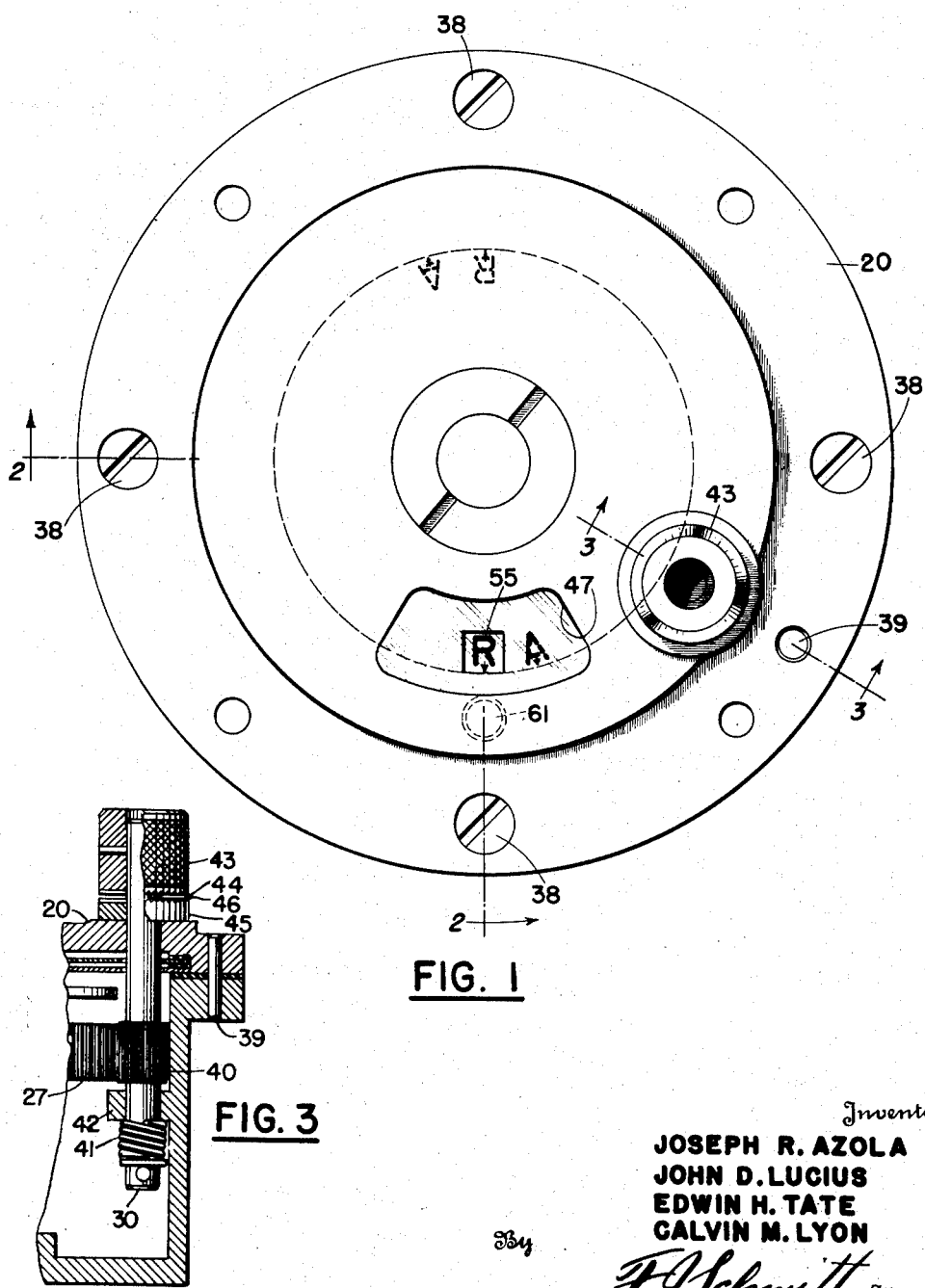

Aug. 26, 1952  J. R. AZOLA ET AL  2,608,603
AUTOMATIC SPARK ADVANCE INDICATOR
Filed July 26, 1949  2 SHEETS—SHEET 1

Inventors
JOSEPH R. AZOLA
JOHN D. LUCIUS
EDWIN H. TATE
CALVIN M. LYON
By
F. J. Schmitt
Attorney

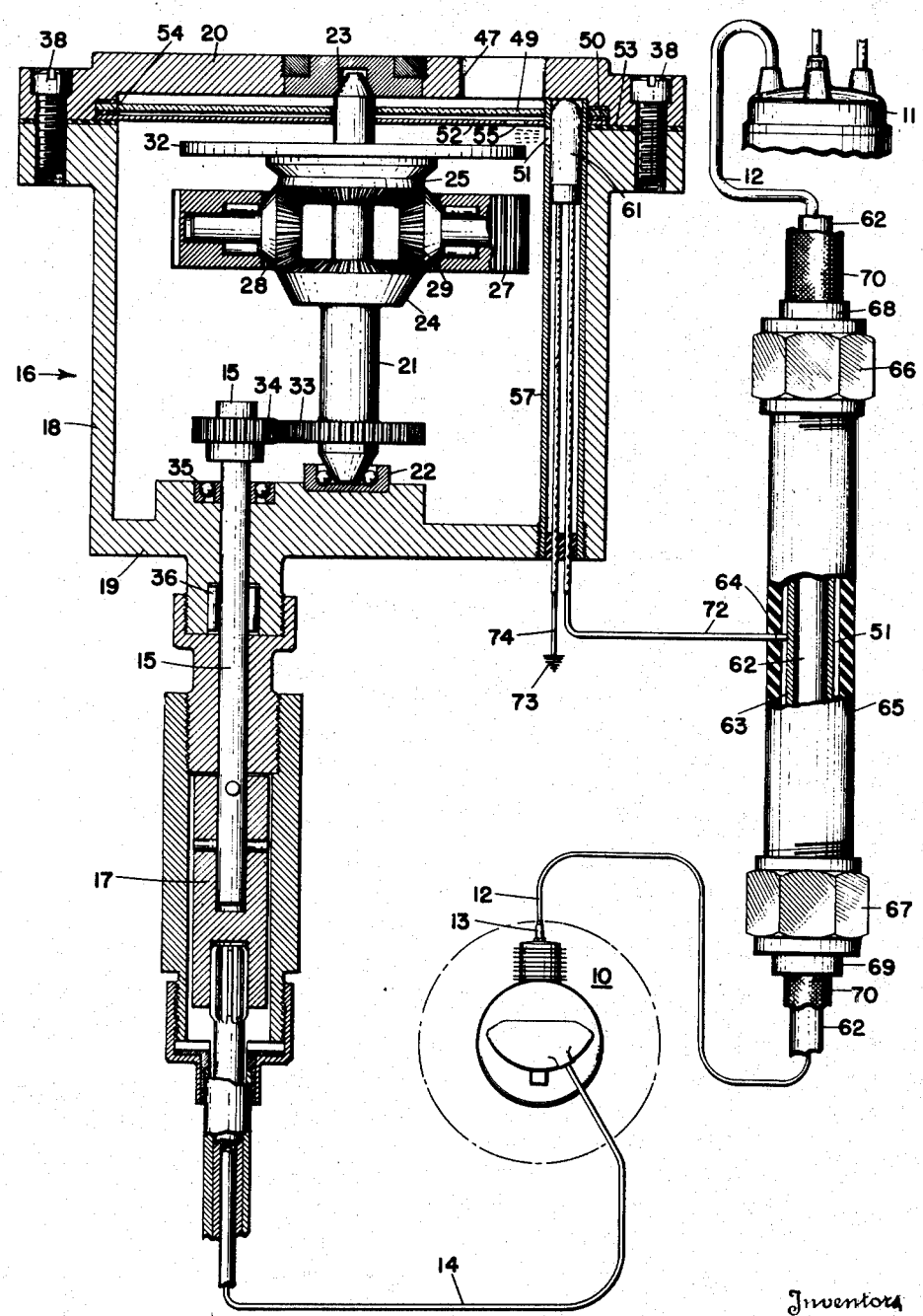

Patented Aug. 26, 1952

2,608,603

UNITED STATES PATENT OFFICE 2,608,603

AUTOMATIC SPARK ADVANCE INDICATOR

Joseph R. Azola, Detroit, Mich., John D. Lucius, Springfield, Mass., Edwin H. Tate, Dayton, Ohio, and Calvin M. Lyon, Lindenhurst, N. Y.

Application July 26, 1949, Serial No. 106,948

7 Claims. (Cl. 175—183)

(Granted under the act of March 3, 1883, as amended April 30, 1928; 370 O. G. 757)

Our invention relates to improvements in spark advance indicating systems, said systems being adapted to indicate the relation between the operation of the ignition system and a predetermined reference point in the operating cycle of the engine.

An important object of the invention is to provide means for visually indicating the measure of automatic spark advance of an ignition system.

Another object of the invention is to provide an automatic spark advance indicator that is responsive to a momentary electric potential induced in an electro-static pick-up member cooperating with an ignition system.

A further object is to provide an apparatus for accurately determining the spark advance of an internal combustion engine without requiring extensive mechanical alterations to the engine structure, which apparatus is simple and inexpensive to install.

A still further object is to provide an improved spark advance indicator that may be installed on an aircraft to test the latter under actual operating conditions in flight, as distinguished from ship or laboratory conditions.

Another object is to provide an apparatus for continuously indicating the spark advance under actual operating conditions in flight.

Other objects and advantages of the invention will be apparent during the course of the following description.

In the accompanying drawings, forming a part of this specification, and in which like numerals are employed to designate like parts throughout the same, Figure 1 is a plan view of the indicating means of our invention;

Figure 2 is a rotated sectional view of Figure 1 taken along line 2—2, and showing the mechanical connection to an engine and the electrical connections to an ignition cable thereof; and, Figure 3 is a sectional view of Figure 1 taken along line 3—3.

In the drawings, wherein for the purpose of illustration, is shown a preferred embodiment of our invention, the reference numeral 10 designates a conventional aircraft engine equipped with a conventional automatic spark advance electrical ignition system including a distributor and leads to its associated spark plugs. Such a distributor, leads, and spark plug are designated as numerals 11, 12 and 13, respectively. A flexible drive means 14 has one end connected into the most convenient side of the engine 10 accessory drive. The other end of said flexible drive means is connected to drive shaft 15 of indicating instrument 16 through coupling means 17.

Said instrument 16 comprises a tubular housing 18 having a closed end 19, and a removable cover plate 20 secured thereto by means of equally spaced screws 38, and a dowel 39, Figure 3, for correct alignment assembly. Centrally of said housing, and coaxially therewith, is rotatably mounted a shaft 21 journalled in supporting bearing 22 and retaining bearing 23. Intermediate the ends of said shaft and mounted rotatively rigid therewith is a bevel gear 24 serving as a side gear component of a differential gear system about to be described. Near the upper end of shaft 21 is rotatably mounted thereon a companion side gear 25. Master ring gear 27 carries four equally spaced rotatable bevel pinions 28 and 29 (others not shown) each with its axis radial to the axis of ring gear 27. Each pinion meshes with the side gears 24 and 25, thereby completing a differential gear arrangement. To the top side of side bevel gear 25 is secured rotatively rigid therewith a scanner disc 32. Said disc is flat black in color and has calibrated thereon white letters R and A along its rim 15° apart, so that R which is retarded or normal spark is 20° before top dead center and A which is advanced spark is 35° before top dead center, referring to that piston which is associated with lead 12.

To the lower end of shaft 21, and mounted rotatively rigid therewith, is secured a gear 33. Said gear 33 meshes with a gear 34 mounted rotatively rigid on shaft 15 which is journalled in supporting ball bearing 35 and in retaining roller bearing 36, both carried by bottom 19 of said housing 18.

This system of gearing reduces the revolutions provided by the accessory drive to 2 to 1 to coincide with the magneto distribution which also runs at a 1 to 2 ratio crankshaft speed. This revolves the scanner disc 32 at the same speed as the distribution rotor within the ignition distributor.

A caging means Figure 3, is provided comprising a shaft 30 extending thru the cover plate 20 and provided with a pinion 40 keyed thereto to mesh with differential ring gear 27. Said shaft 30 is spring loaded by means of associated spring 41 abutting against bracket 42. Said caging means is constructed and arranged for manipulation and locking by means of a knurled knob 43 having a serrated surface 44 coacting with fixed locking plate 45 having companion serrations 46.

Cover plate 20 is provided with an aperture 47 thru which the letters R and A on the scanner disc 32 can be seen. Assembled to the under side of said cover plate is an annular glass plate 49 separated from the cover 20 by means of neoprene gasket 50, and an annular block-out plate 52 separated from said glass plate by means of fibre washer 54. Said block-out plate is provided with an aperture 55 in line with aperture 47 so that the letters R and A can be seen therethrough. Leading gasket 53 is provided between cover 20 and body 18.

A tubular element 57 having an aperture 51 in the wall thereof is mounted vertically adjacent the inner periphery of said tubular housing, and positioned so that said aperture 51 is in radial alignment with aperture 55 and below the block-out plate 52. Within the upper end of said element 57 is secured a vacuum or gaseous tube 61, preferably a Krypton gaseous tube, mounted to throw light through said aperture 51 and onto the letters R and A on scanner disc 32.

Ignition conductor 12 is covered with insulation 62 over which is provided a short metallic induction sleeve 63. An insulation tube 65 is provided to encompass said sleeve, said tube being concentrically spaced from said sleeve. Flanged nuts 66 and 67 threadedly engage the ends of said tube and securely draw thereto the cooperating flanged ends 68 and 69 of shielding mesh 70 surrounding said ignition cable. A hole 64 is provided thru the wall of tube 65 to snugly receive conductor 72 which is electrically connected to induction sleeve 63 as by soldering. Said conductor 72 is connected to one terminal of tube 61 while the other terminal of said tube 61 is grounded at 73 thru conductor 74. Spark plug 13 is likewise grounded to complete the circuit, the continuity of which is from ground 73, conductor 74, through light 61, conductor 72, thru the coaxial condenser arrangement comprising induction sleeve 63 and conductor 12 therein, and thence to spark plug 13 and back to ground.

In operation, the engine 10 is started and the scanner disc 32 is allowed to rotate, being driven thru its gearing and flexible shaft 14 connection by the accessory drive of said engine. The rotation of the scanner disc is at the same speed as the speed of the distributor rotor of the engine distribution system.

The instrument is caged by the manipulation of knob 43 and the cooperation of associated gears 27 and 40 so that at low speed the scanner disc 32 may be set to read R. The caging means is locked in position thru means of the engaging serrations 44 and 46. The instrument is now ready for indicating spark advance.

As the spark is distributed to spark plug 13 thru conductor 12 by distributor 11, a phenomena known as electrostatic voltage is established between said conductor 12 and said induction sleeve 63. The induction sleeve and conductor form what is commonly known as an electrostatic condenser. This phenomena exists only when conductor 12 is charged by a pulse from the distributor. When the charge jumps the gap across the spark plug points a circuit is completed and the electrostatic condenser arrangement discharges through tube 61 which causes the tube to flash. This process is repeated for each pulse distributed to the conductor 12.

The light flash from the tube 61 occurs once in every two revolutions of the crankshaft; thus the light flashes on the calibrated rim of the scanner disc 32 once in every complete cycle of spark distribution.

As the engine speed increases from zero to maximum, the scanner disc R. P. M. remains at a constant relationship to the crankshaft frequency throughout.

At zero R. P. M. the scanner disc, engine crankshaft, and ignition spark are at a constant relationship. As the R. P. M. of the engine increases, the scanner disc and crankshaft remain in constant ratio with each other, but the magneto automatically advances its spark against the rotation of the crankshaft thereby making the light flashes from tube 61 occur earlier in the engine cycle which appears to make the scanner disc calibration image advance from R to A when viewed through the aperture 55 in the block-out plate 52.

As the engine R. P. M. decreases the light flash will occur later in the engine cycle due to the magneto automatically retarding its spark in the direction of rotation of the crankshaft which will cause the scanner disc image to appear to retract from A to R or normal advance position.

Our invention thus visually indicates the automatic spark advance of an ignition system.

It is to be understood that the form of our invention, herewith shown and described, is to be taken as a preferred example of the same, and that various modifications, changes in shape, size and arrangement of parts may be resorted to, without departing from the spirit of our invention, or the scope of the subjoined claims.

The invention described herein may be manufactured and used by or for the Government of the United States of America for governmental purposes without the payment of any royalties thereon or therefor.

What is claimed is:

1. A spark advance indicator for an internal combustion engine including an automatic spark advance ignition system having a spark plug, said indicator comprising: rotatable means having at least one pair of associated indicia thereon to indicate spark advance; means including a differential gear system coupled between said engine and said rotatable means for rotating said rotatable means synchronously with a cycle of operation of said engine; light producing means responsive to the firing of said spark plug; beam forming means positioned between said rotatable means and said light producing means for directing the illumination from said light producing means to a predetermined portion of the area traversed by said indicia as said rotatable means rotates; and caging means coupled to said differential gear system for initially setting the position of said rotatable means relative to said rotating means as said rotatable means is rotating at a predetermined speed whereby a predetermined one of a pair of said indicia is positioned in said portion when said light producing means is actuated.

2. A spark advance indicator for an internal combustion engine including an automatic spark advance ignition system having a spark plug firing circuit, said indicator comprising: a housing having a viewing aperture therein; indicating means rotatably mounted within said housing and having at least one pair of associated indicia thereon, said indicia moving past said aperture as said indicating means rotates; means for rotating said indicating means synchronously with a cycle of operation of said engine; light producing means responsive to the completion of said firing circuit; beam forming means positioned between said indicating means and said light producing means for directing the illumination from said light producing means toward the portion of said indicating means aligned with said aperture; and means for varying the position of said indicating means relative to said rotating means as said indicating means rotates at a predetermined speed whereby a predetermined one of a pair of said indicia is positioned in alignment with said aperture when said light producing means is actuated.

3. A spark advance indicator for an internal combustion engine including an automatic spark advance ignition system having a spark plug firing circuit, said indicator comprising: a housing having a viewing aperture therein; indicating means rotatably mounted in said housing and having at least one pair of associated indicia thereon, said indicia moving past said aperture as said indicating means rotates; means for rotating said indicating means synchronously with a cycle of operation of said engine; light producing means responsive to the completion of said firing circuit and positioned to illuminate the portion of said indicating means aligned with said aperture; and means coupled between said indicating means and said rotating means for varying the angular position of said indicating means relative to said rotating means whereby a predetermined one of a pair of said indicia is aligned with said aperture when said light producing means is actuated as said indicating means rotates at a predetermined speed.

4. A spark advance indicator for an internal combustion engine including an automatic spark advance ignition system having a spark plug firing circuit, said indicator comprising: a housing having a viewing aperture therein; indicating means rotatably mounted in said housing and having spaced pairs of associated indicia thereon; said indicia moving past said aperture as said indicating means rotates; means for rotating said indicating means synchronously with a cycle of operation of said engine; light producing means responsive to the completion of said firing circuit and positioned to illuminate said indicating means; and means coupled between said indicating means and said rotating means for varying the angular position of said indicating means relative to said rotating means as said indicating means rotates whereby a preselected one of a pair of said indicia is aligned with said aperture when said light producing means is actuated as said indicating means rotates at a predetermined speed.

5. A spark advance indicator for an internal combustion engine including an automatic spark advance ignition system having a spark plug firing circuit, said indicator comprising: indicating means having at least one pair of associated indicia thereon to indicate spark advance; means for rotating said indicating means synchronously with a cycle of operation of said engine; light producing means responsive to the completion of said firing circuit; beam forming means positioned between said light producing means and said indicating means for directing the illumination from said light producing means to a predetermined portion of the area traversed by said indicia as said indicating means rotates; and means coupled between said indicating means and said rotating means for varying the angular position of said indicating means relative to said rotating means as said indicating means rotates whereby a preselected one of a pair of said indicia is positioned in said portion when said light producing means is actuated as said indicating means rotates at a predetermined speed.

6. A spark advance indicator for an internal combustion engine including an automatic spark advance ignition system having a spark plug firing circuit, said indicator comprising: indicating means having at least one pair of associated indicia thereon to indicate spark advance; means for rotating said indicating means synchronously with a cycle of said engine; light producing means responsive to the completion of said firing circuit and positioned to illuminate a predetermined portion of the area traversed by said indicia as said indicating means rotates; and means coupled between said indicating means and said rotating means for varying the angular position of said indicating means relative to said rotating means as said indicating means rotates whereby a preselected one of a pair of said indicia is positioned in said portion when said light producing means is actuated as said indicating means rotates at a predetermined speed.

7. A spark advance indicator for an internal combustion engine including an automatic spark advance ignition system having a spark plug firing circuit, said indicator comprising: indicating means having at least one pair of associated indicia thereon to indicate spark advance; means for rotating said indicating means synchronously with a cycle of operation of said engine; light producing responsive to the completion of said firing circuit and positioned to illuminate said indicating means; and means coupled between said indicating means and said rotating means for varying the angular position of said indicating means relative to said rotating means as said indicating means rotates whereby a preselected one of a pair of said indicia is in a predetermined position when said light producing means is actuated as said indicating means rotates at a predetermined speed.

JOSEPH R. AZOLA.
JOHN D. LUCIUS.
EDWIN H. TATE.
CALVIN M. LYON.

REFERENCES CITED

The following references are of record in the file of this patent:

UNITED STATES PATENTS

| Number | Name | Date |
| --- | --- | --- |
| 1,907,069 | Heaton | May 2, 1933 |
| 2,057,963 | Paxton | Oct. 20, 1936 |
| 2,181,149 | Peters et al. | Nov. 28, 1939 |
| 2,219,168 | Thomas | Oct. 22, 1940 |
| 2,366,889 | Westberg et al. | Jan. 9, 1945 |